United States Patent [19]
Gotoh et al.

[11] Patent Number: 5,171,620
[45] Date of Patent: Dec. 15, 1992

[54] HONEYCOMB CORE

[75] Inventors: Hajime Gotoh; Toshihiro Hattori; Tadasi Yokochi; Setsuo Kashiyama; Yukihiro Sumikawa, all of Nagoya, Japan

[73] Assignee: Mitsubishi Rayon Co., Ltd., Tokyo, Japan

[21] Appl. No.: 753,364

[22] Filed: Aug. 30, 1991

[30] Foreign Application Priority Data

Sep. 4, 1990 [JP] Japan .................................. 2-233999

[51] Int. Cl.⁵ .............................................. B32B 3/12
[52] U.S. Cl. .................... 428/116; 428/367; 428/408; 428/910
[58] Field of Search ............... 428/116, 118, 367, 408, 428/910; 156/89, 197, 292

[56] References Cited

U.S. PATENT DOCUMENTS

| | | | |
|---|---|---|---|
| 3,673,058 | 6/1972 | Jackson et al. | 428/118 |
| 4,016,022 | 4/1977 | Browning et al. | 428/116 X |
| 4,346,541 | 8/1982 | Schmitt | 52/799 X |
| 4,713,276 | 12/1987 | Gotoh et al. | 428/361 X |
| 4,756,943 | 7/1988 | Koletzko | 428/116 |
| 5,024,710 | 6/1991 | Sheaffer et al. | 156/89 |
| 5,080,943 | 1/1992 | Chulpsa | 428/367 X |
| 5,096,519 | 3/1992 | Kawakubo et al. | 156/89 |

FOREIGN PATENT DOCUMENTS 155677 9/1985 European Pat. Off. .
351565 1/1990 European Pat. Off. .

OTHER PUBLICATIONS

33rd. International SAMPE Symposium and Exhibition, vol. 33, pp. 73-77 (1988)—T. N. Bitzer adn J. I. Castillo, "Graphite Honeycomb".

*Primary Examiner*—Henry F. Epstein
*Attorney, Agent, or Firm*—Oblon, Spivak, McClelland, Maier & Neustadt

[57] ABSTRACT

A honeycomb core comprising honeycomb ribbons individually obtained by laminating a plurality of sheets of paper comprising short fibers oriented in a specific direction with an orientation degree of 50% or more, wherein the term "orientation degree" means the proportion of the number of fibers oriented at an angle in the range of ±5° with the specific direction to the total number of fibers which is expressed in percentage. The honeycomb core of the present invention is lighter in weight than conventional honeycomb cores and has a high strength properties in a specific direction.

6 Claims, 2 Drawing Sheets

HONEYCOMB CORE

BACKGROUND OF THE INVENTION

1. Field of the Invention

The present invention relates to a novel honeycomb core. More particularly, it relates to a honeycomb core which is lighter in weight and has higher strength properties than do conventional honeycomb cores.

2. Description of the Prior Art

Honeycomb cores has been conventionally formed, for example, of metal foil such as aluminum foil or various papers made of cellulose pulp, synthetic fiber, etc. A honeycomb core made of a suitable material selected from these materials is chosen depending on purpose of use. All of these materials are substantially isotropic.

On the other hand, when a honeycomb core is used as a lightweight material, a compressive stress and a shear stress both in the direction of the core axis are generally often produced in honeycomb ribbons constituting the honeycomb core.

Therefore, when the isotropic material described above is used in a honeycomb ribbon, the honeycomb ribbon is designed to have a strength which is expected to be required in the core axis direction. In this case, in the other directions, the honeycomb ribbon has performance characteristics equal to those in the axis direction though not a very large stress is exerted in the other directions. Therefore, the honeycomb ribbon has an excessive quality with respect to such directions.

In view of such production of stresses, the conventional isotropic materials such as metal foil and paper are not always suitable materials.

On such a line of thinking, as described in the 33th International SAMPE Symposium and Exhibition Vol. 33, pp. 73-77 (1988), an attempt has been made to produce a honeycomb core capable of making the most of performance characteristics of honeycomb ribbons, by using woven fabric which is an anisotropic material. The strength properties of woven fabric in the warp direction and those in the weft direction are usually different. When the structure of woven fabric is suitably chosen, the strength properties in the warp direction and those in the weft direction can be made the same, but even in this case, the strength properties in a direction making an angle of 45° with the warp direction are different from those in the warp direction and those in the weft direction.

The utilization of woven fabric in a honeycomb ribbon, however, involves the following problems.

a) The directions of anisotropy are only the warp direction and the weft direction, i.e., two directions perpendicular to each other, and no optional anisotropy can be realized.

b) A honeycomb ribbon is generally a very thin material. When conventional woven fabric is used, only a relatively thick product can be obtained by comprising a ribbon of a piece of woven fabric and impregnating a resin into the ribbon. Moreover, since the amount of the resin impregnated is large, there cannot be obtained a honeycomb ribbon which is light considering its high strength properties. On the other hand, when the weight of woven fabric is reduced for lightening a honeycomb ribbon, the resulting woven fabric has a rough texture, so that no woven fabric having satisfactory physical properties can be obtained. Therefore, for attaining physical properties required of a honeycomb ribbon by the use of woven fabric, very thin yarn should be used, so that such an attempt is not practicable both technically and economically.

c) In woven fabric, yarns are bent at points at which a warp and a weft cross each other. Therefore, when a compressive stress is exerted in the direction of the axis of yarn, the yarns are further bent at the bent portions, namely, the woven fabric is deteriorated. Accordingly, it is impossible to make the most of the compressive strength of the yarn itself.

d) When in a honeycomb ribbon made of woven fabric, fibers are desired to be oriented at an angle of ±45° with the longitudinal direction of the ribbon, a long piece of bias cloth should be used for obtaining such a long ribbon. But, the production of such a long piece of bias cloth is technically difficult. Even when it is possible, it is not economical.

The present invention is intended to provide a honeycomb core which does not have such defects and in which fibers have been oriented in an optional direction if necessary.

SUMMARY OF THE INVENTION

That is, the gist of the present invention consists in a honeycomb core comprising honeycomb ribbons individually obtained by laminating a plurality of sheets of paper comprising short fibers oriented in a specific direction with a high orientation degree of 50% or more. Here, the term "orientation degree" means the proportion of the number of fibers oriented at an angle in the range of ±5° with the specific direction to the total number of fibers which is expressed in percentage.

DESCRIPTION OF THE PREFERRED EMBODIMENTS

Typical examples of honeycomb core composed of honeycomb ribbons are hexagonal core and tube core. The honeycomb core of the present invention may be of any type so long as it is composed of honeycomb ribbons. Specific examples of types of the honeycomb core of the present invention are hexagonal core, overexpanded core, underexpanded core, square core, reinforced core, and flexible core. The present invention is illustrated below by taking the case of a hexagonal core.

Figure 1:
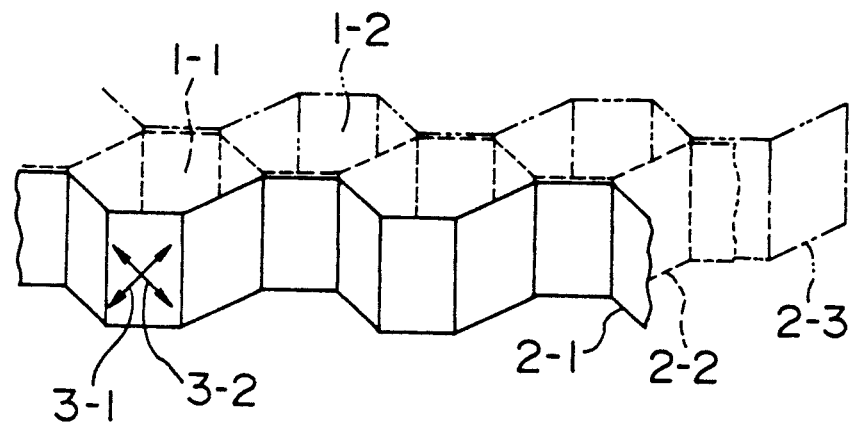
FIG. 1 is a perspective view of a honeycomb core which is one embodiment of the present invention.

FIG. 1 is a perspective view of a hexagonal core. The cell 1-1 constituting the hexagonal core is formed of two ribbons 2-1 and 2-2. Similarly, the cell 1-2 is formed of ribbons 2-2 and 2-3. Thus, one cell is formed of two ribbons.

The present invention is characterized by using as the ribbon, a laminate of paper having anisotropy, i.e., a property that strength properties in a specific direction is higher than those in other directions.

As the paper having anisotropy, there is used paper comprising short fibers oriented in a specific direction with an orientation degree of 50% or more. Such paper can be produced, for example, by the process disclosed in U.S. Pat. No. 4,713,276.

Figure 4:
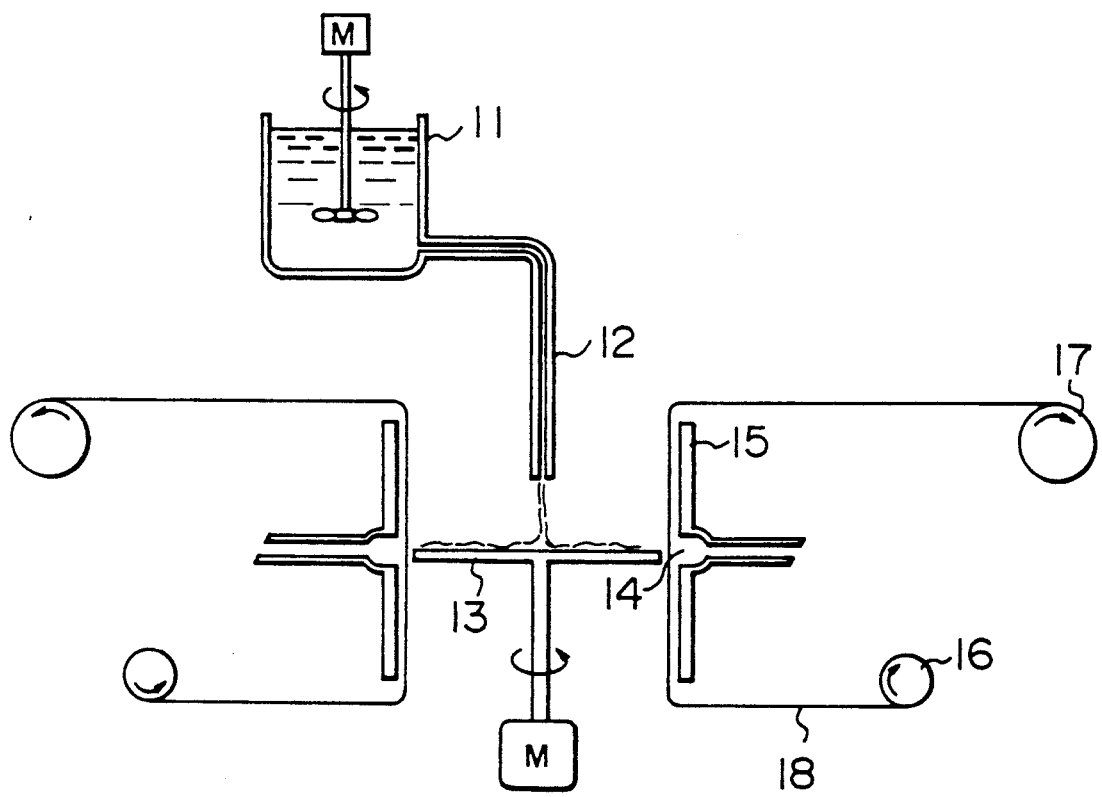
FIG. 4 is one example of apparatus for use in producing paper having anisotropy.

FIG. 4 shows one example of apparatus for use in the process. The short fibers are dispersed in a dispersing medium such as water. The resulting dispersion is supplied from a dispersing vessel 11 to a rotary disk member 13, which is rotating, through a feed pipe 12 so that the dispersion supplied to the center of the rotary disk member moves toward the periphery of the disk 13 by the centrifugal force which generates due to the rotation.

Around the disk is provided a collecting member 18 which moves perpendicularly to the surface of the disk from a feed roller 16 to a winding roller 17 via the surface of a suction box 15 having a slit 14. The short fibers scattered to the periphery of the disk are collected on the collecting member 18 in such a manner that they are oriented perpendicularly to the longitudinal direction of the collecting member. The orientation degree of the short fibers can be controlled by the length, bore diameter and sectional shape of the feed pipe 12, the convergent shape of the edge of the pipe, the rotation speed of the disk and the like.

The paper used in the present invention is not limited to paper produced by this process. The orientation degree of ordinary paper comprising non-oriented fibers is 5.6%.

The kind of fiber constituting the paper used in the present invention should be determined depending on performance characteristics required for purpose of use of the honeycomb core. The fiber is preferably one which has high specific modulus and specific strength. From this point of view, the fiber is most preferably carbon fiber. When economical benefit is taken into consideration, aramide fiber is also preferable depending on purposes. The length of short fibers constituting the paper used in the present invention is preferably 3 to 100 mm because such a fiber length permits easy production of paper which is easy to impregnate with a resin.

When fibers are in a somwhat disordered state, voids are formed between the fibers. Therefore, the fibers can be completely fixed by means of a resin or carbon, and moreover a ribbon obtained by the use of the fibers has an increased thickness. This is advantageous for preventing buckling.

Each of the honeycomb ribbons used in the present invention is obtained by laminating a plurality of sheets of paper such as are described above. As to the mode of the lamination, it is preferable to laminate the sheets so that there may be a difference between one of them and one or more other sheets in the direction of orientation of short fibers. By such lamination, there can be obtained a honeycomb ribbon having excellent strength properties in a plurality of predetermined directions.

Figure 2:
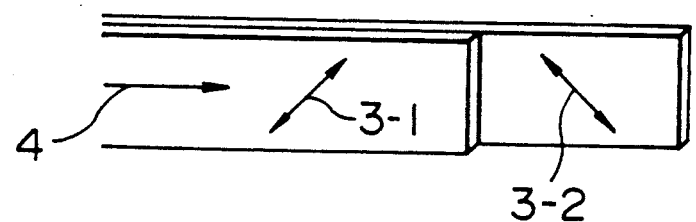
FIG. 2 is a perspective view of paper constituting the honeycomb core.

As to the predetermined directions, a strength particularly effective against shear stress on the honeycomb core can be attained by adjusting the direction of orientation of short fibers contained in one or more sheets among a plurality of sheets of paper to +45° with the longitudinal direction of the honeycomb ribbon, and the direction of orientation of short fibers contained in other one or more sheets to −45° with the longitudinal direction of the honeycomb ribbon. An example of such lamination is shown in FIG. 2. FIG. 2 shows a honeycomb ribbon obtained by laminating two sheets of paper, in which the direction of orientation of short fibers in one sheet 3-1 is +45° with the longitudinal direction of the ribbon, and that in the outer sheet 3-2 is −45°.

A honeycomb core made of honeycomb ribbons individually obtained by laminating three or more sheets of papers so as to orient short fibers at angles of +45°, 90° and −45°, respectively, with the longitudinal direction of the ribbon, can have a strength effective against shear stress and compressive stress.

As the honeycomb ribbon used in the honeycomb core of the present invention, there may be used honeycomb ribbons individually obtained by laminating a plurality of sheets of paper each of which comprises short fibers oriented in a specific direction. Depending on a stress level required of the honeycomb core, a laminate having optional performance characteristics can be obtained by properly choosing, for example, the directions of orientation, a combination of the dirctions of orientation, and the number of sheets of paper laminated for each direction of orientation.

The honeycomb core of the present invention is formed of the above-mentioned honeycomb ribbons by a conventional method. In forming the honeycomb ribbons of paper and forming the honeycomb of the honeycomb ribbons, a matrix is used for bonding sheets of paper to each other and bonding the honeycomb ribbons to each other.

As the matrix, any resin can be used depending on purpose of use, though epoxy resins, phenolic resins and imide resins are preferably used because of, for example, their excellent modulus of elasticity, heat resistance, and adhesive properties with fiber.

When the honeycomb core is used in the space industry, a carbon matrix is preferably used. A honeycomb core comprising carbon fiber as short fiber and a carbon matrix as matrix can be produced by repeating a procedure comprising impregnating a resin into paper such as is described above, and then pyrolyzing the resin in an inert gas. It can be produced also by chemical vapor deposition of carbon on paper.

For producing the honeycomb core comprising carbon fiber as short fiber and a carbon matrix as matrix, the employment of porous paper is advantageous, for example, in that in the method comprising resin impregnation and pyrolysis, the employment is effective in discharging pyrolysis gas, improving the impregnating ability during re-impregnation, and preventing the shrinkage of a product during pyrolysis and carbonization, and that in the carbon chemical vapor deposition, uniform carbon deposition can be carried out.

For the paper used in the present invention, the volume content of fiber in the paper is preferably 8 to 50%, more preferably 10 to 40%.

In laminating sheets of paper and forming a honeycomb core, when the handleability of the sheets is taken into consideration, it is preferable to impregnate the sheets with a resin, then laminate them into a honeycomb ribbon, and form the thus obtained honeycomb ribbons properly into a honeycomb of desired shape.

When sheets of paper are laminated into a honeycomb ribbon, strain tends to be produced in the case where the directions of orientation of fibers in the honeycomb ribbons are unsymmetrical in the whole honeycomb. Accordingly, for example, for a. making the stress distribution uniform, b. improving the bond strength between the ribbons, and c. reducing the frequency of the production of strain of the structure of the honeycomb, it is preferable that 1) the honeycomb ribbons themselves are symmetrical with respect to the direction of thickness, or 2) the honeycomb is composed by lamination of the honeycomb ribbons so as to have a symmetrical structure with respect to both the bonded surface and the orientation of fibers, by bonding the obverse sides of the honeycomb ribbons to each other and the reverse sides thereof to each other.

Figure 3:
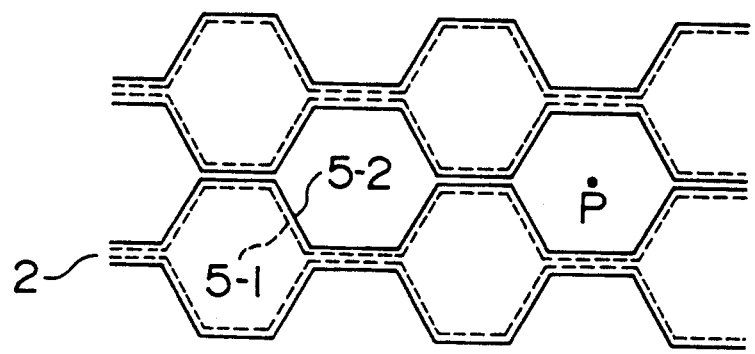
FIG. 3 is a plan view of the honeycomb core. The dot over the symbol P shows the center of a cell.

FIG. 3 shows the above case 2). In FIG. 3, the dotted line shows a sheet of paper 5-1 comprising short fibers oriented in a certain direction (for example, a direction making an angle of +45° with the longitudinal direction of the ribbon), the solid line shows a sheet of paper 5-2 comprising short fibers oriented in another direction (for example, a direction making an angle of −45° with the longitudinal direction of the ribbon), and numeral 2 shows a honeycomb ribbon obtained by laminating these two sheets of paper.

As compared with honeycomb cores obtained by using woven fabric as honeycomb ribbons, the honeycomb core of the present invention has the following characteristics and hence is of great value.

The honeycomb core of this invention can be designed to have a predetermined strength in any direction, by freely choosing the direction of orientation of short fibers in sheets of paper to be laminated and the number of the sheets of paper comprising short fibers oriented in a specific direction which are to be laminated.

In woven fabric, a warp or a weft, or both, are unavoidably bent for composing the texture of the woven fabric. Therefore, the woven fabric is disadvantageous in that it is liable to be buckled by a force in the warp direction and/or the weft direction. On the other hand, in the present invention, paper is used and hence the linearity of fiber can be maintained. Therefore, the above defects due to the woven fabric can be removed and it is possible to make the most of the strength properties of fiber.

As a honeycomb core obtained by using carbon fiber woven fabric which has, for example, the dimensions described in Examples, there can be obtained only a honeycomb core having a density of at least about 0.1 g/cm$^3$. On the other hand, as the honeycomb core of the present invention, there can be obtained a honeycomb core having such a low density as cannot be attained in a honeycomb core obtained by using woven fabric.

The present invention is more concretely explained below with reference to examples.

The orientation degree of paper was measured by counting fibers in each direction of orientation visually in an enlarged photograph.

EXAMPLE 1

By the process disclosed in Example 1 of U.S. Pat. No. 4,713,276, there was obtained paper of oriented carbon fibers having a basis weight of 10 g/m$^2$ in which carbon fibers having a thickness of 7 to 8 microns, a fiber length of 12 mm and a modulus of elasticity of 24 ton/mm$^2$ had been oriented at an angle of 90° with the longitudinal direction of the paper with an orientation degree of 75%. The paper was impregnated with an epoxy resin in an amount of 15 g/m$^2$ to obtain a prepreg having a resin content of 60% by weight. Ribbons of 100 mm in width were cut out of the prepreg so as to orient carbon fibers at an angle of +45° with the longitudinal direction of each ribbon. Two of the ribbons were laminated so as to bring their obverse sides into contact with each other, whereby there was obtained a laminated prepreg in which carbon fibers had been oriented at angles of ∓45° with the longitudinal directions of the ribbons, respectively, and the resin had not been cured.

Similarly, by laminating two ribbons comprising carbon fibers oriented at an angle of −45° with the longitudinal direction of each ribbon, so as to bring their obverse sides into contact with each other, there was obtained an uncured laminated prepreg in which carbon fibers had been oriented at angles of ±45° with the longitudinal directions of the ribbons, respectively.

Each of the two laminated prepregs was molded in a flat mold corresponding to a cell size of 3/16 inch to cure the epoxy resin, whereby corrugated sheets were obtained.

Subsequently, the corrugated sheets in which carbon fibers had been oriented at ∓45° and ±45°, respectively, were alternately laminated and bonded with an epoxy resin to obtain a honeycomb block in which the orientation of fibers was symmetrical with respect to the center line of core. The honeycomb block was sliced to a thickness of 12.5 mm to obtain a hexagonal core comprising carbon fibers oriented at angles of ±45° with the directions of the ribbons, respectively.

In the same manner as described above, there were produced a hexagonal core comprising carbon fibers oriented at angles of 0° and 90° with the directions of ribbons, respectively, and a hexagonal core comprising carbon fibers oriented at angles of ±67.5° with the directions of ribbons, respectively (each hexagonal core had a thickness of 12.5 mm). In addition, paper of non-oriented carbon fibers having a basis weight of 20 g/m$^2$ produced by the use of the same carbon fiber as above by a conventional wet paper-making method was impregnated with an epoxy resin in an amount of 30 g/m$^2$, and using the thus treated paper, a honeycomb core comprising non-oriented carbon fibers was produced in the same manner as for the above honeycomb cores comprising oriented carbon fibers.

For these 4 kinds of honeycomb cores, there were measured density (ASTM C271), compressive strength and compressive modulus (ASTM C365), and shear strength and shear modulus in the direction of the ribbon (ASTM C273). The results obtained are shown in Table 1.

As is clear from Table 1, by the use of honeycomb ribbons individually obtained by laminating a plurality of sheets of paper comprising short fibers oriented in a specific direction with an orientation degree of 50% or more, physical properties of a honeycomb can be improved and there can be obtained a honeycomb core having such a low density of 0.05 g/cm$^3$ as cannot possibly be attained by using woven fabric conventionally.

TABLE 1

| Name of sample | Density g/cm$^3$ | Compressive strength kg/cm$^2$ | Compressive modulus kg/cm$^2$ | Shear strength kg/cm$^2$ | Shear modulus kg/cm$^2$ |
| --- | --- | --- | --- | --- | --- |
| ±45° Oriented-fibers honeycomb | 0.05 | 26 | 2,000 | 26 | 3,500 |
| ±67.5 Oriented-fibers | " | 30 | 7,000 | 27 | 2,000 |

TABLE 1-continued

| Name of sample | Density g/cm$^3$ | Compressive strength kg/cm$^2$ | Compressive modulus kg/cm$^2$ | Shear strength kg/cm$^2$ | Shear modulus kg/cm$^2$ |
| --- | --- | --- | --- | --- | --- |
| honeycomb 0/90 Oriented-fibers honeycomb | " | 28 | 2,500 | 19 | 1,400 |
| Non-oriented fiber honeycomb | " | 16 | 1,600 | 16 | 1,000 |

EXAMPLE 2

The same carbon fiber paper (orientation degree: 75%, weight: 10 g/m$^2$) as obtained in Example 1 was impregnated with a phenolic resin in an amount of 30 g/m$^2$ to obtain a prepreg having a resin content of 75%. In the same manner as in Example 1 except for using this prepreg, there were obtained corrugated sheets in which carbon fibers had been oriented at ±45° and ∓45°, respectively, with the longitudinal directions of ribbons, respectively. These two kinds of sheets were alternately laminated by the use of a phenolic resin so as that the orientation of fibers might be symmetrical with respect to the center line of core, whereby a honeycomb core having a cell size of 3/16 inch and a density of 0.05 g/cm$^3$ was obtained.

The honeycomb core was heated to 1,100° C. in nitrogen gas at a heating rate of 600° C./hr to carbonize the phenolic resin, whereby a honeycomb core comprising a carbon matrix was obtained. This honeycomb core had a density of 0.027 g/cm$^3$ and was porous. Substantially no deformation was observed in the honeycomb.

Then, using a gas prepared by diluting propane gas in 6 times with nitrogen gas, chemical vapor deposition of carbon was carried out at a deposition temperature of 800° C. on the porous honeycomb core comprising a carbon matrix obtained in the above. Thus, there was obtained a honeycomb comprising a carbon matrix which had a density of 0.05 g/cm$^3$. During the chemical vapor deposition, the honeycomb was not deformed, and uniform deposition was possible.

What is claimed is:

1. A honeycomb core comprising honeycomb ribbons individually obtained by laminating a plurality of sheets of paper comprising short fibers oriented in a specific direction with an orientation degree of 50% or more, wherein the term "orientation degree" means the proportion of the number of fibers oriented at an angle in the range of ±5° with the specific direction to the total number of fibers which is expressed in percentage.

2. A honeycomb core according to claim 1, wherein there is a difference between one of the plurality of the sheets of paper constituting the honeycomb ribbon and one or more other sheets in the direction of orientation of short fibers.

3. A honeycomb core according to claim 2, wherein the direction of orientation of short fibers contained in one or more of the plurality of the sheets of paper constituting the honeycomb ribbon is ±45° with the longitudinal direction of the honeycomb ribbon, and the direction of orientation of short fibers contained in one or more other sheets is −45° with the longitudinal direction of the honeycomb ribbon.

4. A honeycomb core according to claim 1, wherein the short fiber comprises carbon fiber.

5. A honeycomb core according to claim 4, wherein a matrix used for bonding the sheets of paper to each other and bonding the honeycomb ribbons to each other is carbon.

6. A honeycomb core comprising honeycomb ribbons individually obtained by the process comprising laminating a plurality of sheets of paper comprising short carbon fibers oriented in a specific direction with an orientation degree of 50% or more, wherein the term "orientation degree" means the proportion of the number of fibers oriented at an angle in the range of ±5 degrees with the specific direction to the total number of fibers which is expressed in percentage, by impregnating the individual sheets of paper with a resin, laminating them into a honeycomb ribbon, forming the thus obtained honeycomb ribbons into a honeycomb of desired shape and carbonizing the resin matrix to form carbon bonds.

* * * * *